(12) United States Patent
Bougaev et al.

(10) Patent No.: US 7,920,974 B2
(45) Date of Patent: Apr. 5, 2011

(54) GENERATING A VIBRATION PROFILE FOR A ROTATING COOLING DEVICE IN A COMPUTER SYSTEM

(75) Inventors: Anton A. Bougaev, La Jolla, CA (US); Aleksey M. Urmanov, San Diego, CA (US); David K. McElfresh, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 43 days.

(21) Appl. No.: 12/391,124

(22) Filed: Feb. 23, 2009

(65) Prior Publication Data

US 2010/0217543 A1   Aug. 26, 2010

(51) Int. Cl.
*G06F 19/00* (2006.01)
(52) U.S. Cl. .......................................................... 702/56
(58) Field of Classification Search ................. 702/56, 702/76; 73/570, 579
See application file for complete search history.

(56) References Cited

U.S. PATENT DOCUMENTS

| | | | | |
|---|---|---|---|---|
| 4,302,813 A | * | 11/1981 | Kurihara et al. | 702/56 |
| 4,352,293 A | * | 10/1982 | Kurihara et al. | 73/593 |
| 5,602,757 A | * | 2/1997 | Haseley et al. | 702/56 |
| 5,610,339 A | * | 3/1997 | Haseley et al. | 73/660 |
| 5,744,723 A | * | 4/1998 | Piety | 73/660 |
| 5,800,331 A | * | 9/1998 | Song | 494/7 |
| 2002/0038188 A1 | * | 3/2002 | Fioravanti | 702/75 |
| 2002/0123860 A1 | * | 9/2002 | Fioravanti et al. | 702/182 |
| 2003/0229469 A1 | * | 12/2003 | Song | 702/145 |
| 2004/0105231 A1 | | 6/2004 | Chen | |
| 2004/0212913 A1 | | 10/2004 | Jung | |
| 2005/0050448 A1 | | 3/2005 | Dehart | |
| 2007/0032966 A1 | * | 2/2007 | Song | 702/35 |
| 2007/0227246 A1 | * | 10/2007 | Vian et al. | 73/462 |
| 2007/0272013 A1 | * | 11/2007 | Vian et al. | 73/460 |
| 2009/0067080 A1 | * | 3/2009 | Gross et al. | 360/71 |
| 2009/0195922 A1 | * | 8/2009 | Urmanov et al. | 360/97.02 |

\* cited by examiner

*Primary Examiner* — Cindy H Khuu
(74) *Attorney, Agent, or Firm* — Park, Vaughan, Fleming & Dowler LLP

(57) ABSTRACT

One embodiment of the present invention provides a system that generates a vibration profile for a rotational device in a computer system. During operation, the system sequentially sweeps a rotation speed of a rotational device over a range of rotation speeds. While driving the rotational device at each rotation speed, the system collects a time-domain vibration signal produced by the rotational device and subsequently computes a frequency spectrum of the time-domain vibration signal. In this way, the system generates a set of frequency spectra associated with the range of rotation speeds. Next, the system combines the set of frequency spectra to generate a composite vibration profile for the rotational device.

20 Claims, 4 Drawing Sheets

GENERATING A VIBRATION PROFILE FOR A ROTATING COOLING DEVICE IN A COMPUTER SYSTEM

BACKGROUND

1. Field

Embodiments of the present invention generally relate to techniques for improving the vibrational health of computer systems. More specifically, embodiments of the present invention relate to techniques for generating vibration profiles of one or more rotating cooling devices in a computer system.

2. Related Art

Computer systems, such as computer servers and storage arrays, can be adversely affected by mechanical vibrations of internal components and structures. In particular, certain rotational system components, such as cooling fans, air blowers and air movers, generate rotational vibrations during computer system operation. When operating at specific rotational frequencies (i.e., speeds), the rotational vibrations from cooling fans or air movers can excite the structural resonances of a chassis of a computer system, thereby causing destructive amplification of the rotational vibrations. The amplified rotational vibrations can cause performance degradation and reliability problems for interconnects, motors, and data storage devices, such as optical drives and hard-disk drives (HDDs). For example, HDDs are very sensitive to these rotational vibrations. Hence, excessive rotational vibrations can cause drastic degradation of read and/or write throughput performance of the HDDs.

Moreover, as computer system designs continue to incorporate more CPUs, memory, and storage into the same form factor, system designers are installing more cooling fans and are operating them at higher fan speeds to provide sufficient cooling to support the high performance operation. All of these factors cause higher rotational vibration levels inside the computer systems, which can be further aggravated by structural resonances of the chassis.

However, there typically exists no specification for the vibrational characteristics of these cooling devices, such as device housing resonances. Furthermore, vibrational characteristics can vary greatly from one cooling device to another. For example, it has been noticed that even two cooling fans of the same model and balanced by the same person can drastically differ in the amount of vibration they produce during operation. The lack of vibration profiles for the cooling devices makes it extremely difficult to meet vibrational health targets for computer systems, because designers have little control over the vibrations produced by these devices.

Hence, there is a need for a method and an apparatus that facilitates generating an accurate vibration profile of a rotational cooling device without the above-described problems.

SUMMARY

One embodiment of the present invention provides a system that generates a vibration profile for a rotational device in a computer system. During operation, the system sequentially sweeps a rotation speed of a rotational device over a range of rotation speeds. While driving the rotational device at each rotation speed, the system collects a time-domain vibration signal produced by the rotational device and subsequently computes a frequency spectrum of the time-domain vibration signal. In this way, the system generates a set of frequency spectra associated with the range of rotation speeds. Next, the system combines the set of frequency spectra to generate a composite vibration profile for the rotational device.

In a variation, the system collects the time-domain vibration signal using a vibration sensor coupled to the rotational device.

In a further variation, the vibration sensor is an accelerometer.

In a further variation, the rotational device is a rotational cooling device, which can include a cooling fan, or an air mover.

In a further variation, each frequency spectrum includes a set of values corresponding to a set of frequency bins, and the system combines the set of frequency spectra to generate the composite vibration profile by, at each frequency increment, selecting the maximum amplitude among the set of amplitudes for the set of frequency spectra to represent the amplitude at the frequency increment for the composite vibration profile.

In a further variation, the composite vibration profile represents worst-case vibration levels for the set of frequency bins.

In a further variation, the system identifies a set of resonant frequencies within the composite vibration profile.

In a further variation, the rotational device is mechanically affixed to the chassis of the computer system.

In a further variation, the system first identifies structural resonances of the chassis of the computer system, and then corrects the composite vibration profile to remove the effect of the structural resonances of the chassis.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

The present technique facilitates performing unambiguous vibration characterization of rotational devices, such as cooling fans, in a computer system. In one embodiment, the system uses an embedded accelerometer and fine-step fan speed sweep procedure to obtain a fan's vibration profile. This vibration profile can be computed by taking the maximum amplitude for each frequency bin over N frequency spectra corresponding to N speed steps, with each frequency spectrum adjusted for the resonant characteristics of the fan mounting device. In this way, the obtained vibration profile can represent the worst-case vibration levels produced by the fan under various operating conditions.

Computer System

Figure 1:
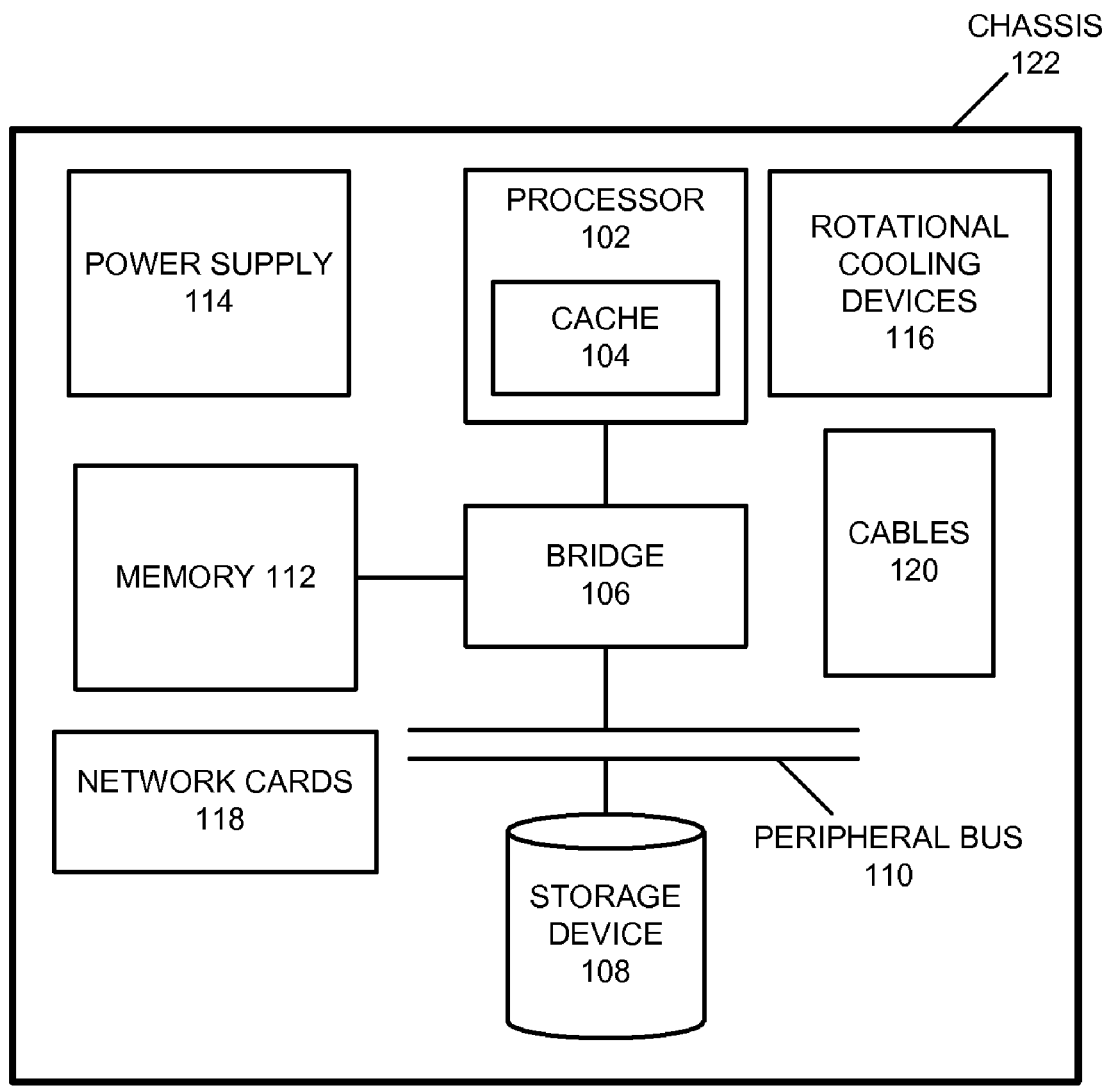
FIG. 1 illustrates a computer system having multiple rotational cooling devices in accordance with an embodiment of the present invention.

FIG. 1 illustrates a computer system 100 having multiple rotational cooling devices 116 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores. Processor 102 includes a cache 104 that stores code and data for execution by processor 102.

Although FIG. 1 illustrates computer system 100 with one processor, computer system 100 can include more than one processor. In a multi-processor configuration, the processors can be located on a single system board, or multiple system boards. Computer system 100 can include, but is not limited to, a server, a server blade, a datacenter server, a field-replaceable unit, or an enterprise computer system.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory. In particular, storage device 108 can include one or multiple hard disk drives (HDDs), or an HDD array.

Processor 102 communicates with memory 112 through bridge 106. Memory 112 can include any type of memory that can store code and data for execution by processor 102. This includes but is not limited to, dynamic random access memory (DRAM), static random access memory (SRAM), flash memory, read only memory (ROM), and any other type of memory now known or later developed. Note that processor 102, cache 104, bridge 106, peripheral bus 110 and memory 112 are typically located on a system board/motherboard (not shown).

Computer system 100 also includes other system components, which include, but are not limited to power supply 114, one or more rotational cooling devices 116, network cards 118, and cables 120 that interconnect system components. Furthermore, computer system 100 is enclosed by chassis 122, which provides housing and mechanical supports for the aforementioned computer system components.

More specifically, rotational cooling devices 116 typically include a number of cooling fans, and can also include one or more air blowers, air movers, and other types of cooling devices which produce rotational motions. These rotational cooling devices are deployed to increase air circulation around heat-generating components in computer system 100 and to pump heat out of computer system 100. Such heat-generating components can include all of the aforementioned components and modules inside computer system 100. Typically, rotational cooling devices 116 are placed at different locations inside computer system 100 and in the vicinities of the heat-generating components.

Note that although computer system 100 is used for the purposes of illustration, embodiments of the present invention can generally be applied to other computer systems, such as desktop computers, workstations, storage arrays, embedded computer systems, automated manufacturing systems, and other computer systems which use one or more rotational cooling devices for system cooling. Hence, the present invention is not limited to the specific implementation of computer system 100 as illustrated in FIG. 1.

As rotational cooling devices become increasingly more powerful, they can generate a significant amount of rotational vibrations during computer system operation. Furthermore, different rotational cooling devices can have very different vibration characteristics and vibration levels.

In the following discussion, the terms "vibration" and "rotational vibration" are used interchangeably to mean mechanical vibrations caused by rotational motion. The terms "vibration profile" and "vibration characteristics" are used interchangeably to mean vibration levels as a function of rotation frequencies. We also use the term "speed" to refer to the rotation frequency of a rotational cooling device. Note that when a rotational cooling device typically operates at a constant rotational speed in terms of rotations per minute (RPM), this RPM value gives rise to a corresponding frequency component in an associated vibration spectrum (in Hz). For example, a speed of 6000 RPM creates a rotational vibration containing a frequency component of (6000 RPM)/(60 sec)=100 Hz.

The techniques for vibration characterization of the rotational cooling devices are described below in the context of a "fan" or "cooling fan." However, these techniques are equally applicable to air blowers, air movers, or any other fixed or varying speed cooling device that produces rotational vibrations.

An Embedded System for Vibration Characterization of a Cooling Fan

Figure 2:
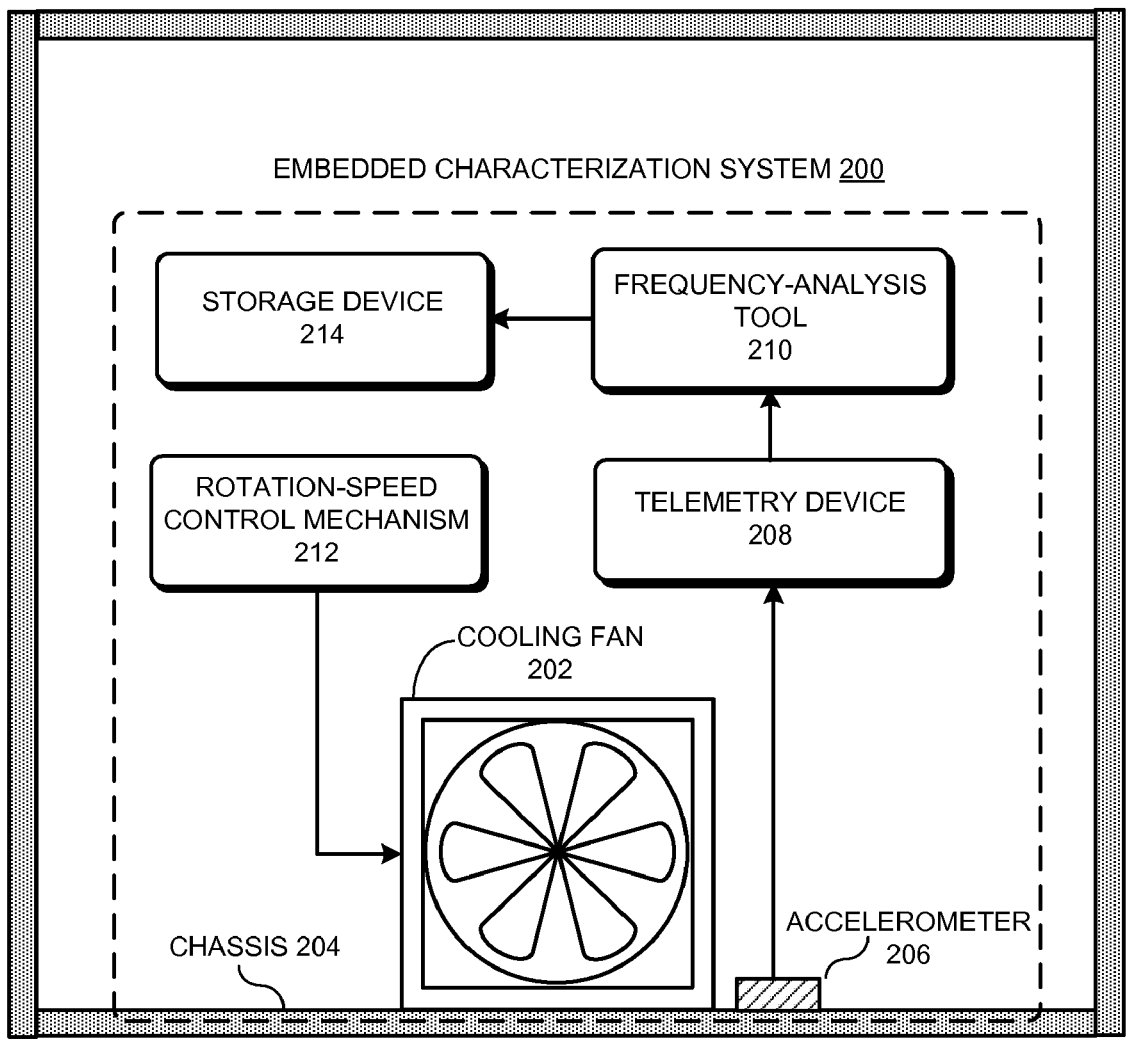
FIG. 2 illustrates an embedded characterization system for generating a vibration profile for a cooling fan in accordance with an embodiment of the present invention.

FIG. 2 illustrates an embedded characterization system 200 for generating a vibration profile for a cooling fan 202 in accordance with an embodiment of the present invention. Note that embedded characterization system 200 (or "characterization system 200") is embedded in a computer system 201.

As illustrated in FIG. 2, characterization system 200 includes cooling fan 202 (or "fan 202") to be characterized. The housing of fan 202 is mechanically coupled to chassis 204 of computer system 201. Characterization system 200 also includes an embedded accelerometer 206 which is mechanically coupled to chassis 204. Accelerometer 206 can be used to detect vibration levels and frequencies produced by fan 202 during fan operation. Specifically, accelerometer 206 is configured to pick up vibration signals generated by rotating fan 202, wherein the vibration signals contain information on vibration levels at different frequencies. Accelerometer 206 can then produce an electrical signal that replicates the vibration signals from fan 202.

In some embodiments, other than placing directly on chassis 204, accelerometer 206 may be mechanically mounted on or directly integrated with the motherboard of computer system 201 to detect the rotational vibrations produced by fan 202. In other embodiments, accelerometer 206 may be placed on or integrated with fan 202 to detect the fan vibration. In some embodiments, other types of rotational vibration sensors may be used in place of accelerometer 206 to measure the fan vibration. Hence, the present invention is not limited to the particular configuration illustrated in FIG. 2.

The output from accelerometer 206 is coupled to a telemetry device 208, which is capable of gathering electrical signals produced by accelerometer 206 and generating a time-series signal for the gathered fan vibration signals. In one embodiment of the present invention, telemetry device 208 is part of a Continuous System Telemetry Harness (CSTH), which provides real-time outputs for the instrumentation signals. In some embodiments, telemetry device 208 is a data acquisition (DAQ) module.

The time-domain vibration data generated by telemetry device 208 is received by a frequency-analysis tool 210, which converts the time-domain signals into corresponding frequency-domain spectra by using, for example, a fast Fourier transform (FFT) technique. Frequency-analysis tool 210 can be implemented in software, hardware, or a combination of software and hardware. The resulting vibration frequency spectra generated by frequency-analysis tool 210 may be stored for further processing.

In one embodiment of the present invention, prior to characterizing the vibration profile of fan 202 using characterization system 200, chassis 204 itself is characterized in a setup with fan 202 mounted on it to determine natural resonances and other frequency-domain characteristics of chassis 204. This characterization can be performed by securing chassis 204 on a vibrational table and then running a "swept sine" test with a fixed amplitude level for all swept frequencies. The response of chassis 204 to the swept sine test can be measured by using an accelerometer placed on chassis 204, such as accelerometer 206, or other types of vibration sensors mechanically coupled to chassis 204. The resulting vibration frequency response of chassis 204 can be used to identify a set of natural resonant frequencies of chassis 204 of computer system 201, and can be stored for further processing.

Fan 202 is also coupled to an embedded rotation-speed control mechanism 212 within computer system 201, which provides power to and controls the rotation speed of fan 202. Note that rotation-speed control mechanism 212 can include a power supply unit. In some embodiments, rotation-speed control mechanism 212 is configured to control fan 202 to rotate at a set of speeds in a speed range from a minimum speed to a maximum speed. In some embodiments, these speeds are evenly spaced in the speed range, while in other embodiments the speeds are not evenly spaced. Further, the increments between fan speeds can be varied by rotation-speed control mechanism 212. Rotation-speed control mechanism 212 can be implemented in hardware or a combination of software and hardware.

During a vibration characterization of fan 202, the speed of the fan can be sequentially swept from the minimum allowable fan speed to a maximum allowable fan speed across a set of fan speeds. In some cases, these fan speeds are set by pulse width modulation (PWM) duty cycle represented by a number from 0 to 255, wherein 255 corresponds to the full RPM of the fan. During the fan speed sweep process, the fan speed can be varied in fine increments or coarse increments, wherein using fine increments typically facilitates capturing higher resolution of vibration characteristics. Further, the rate of the sweep can be controlled by the dwell time at each fan speed using rotation-speed control mechanism 212.

While driving the fan at each speed over the sweep range, a time-domain vibration signal of the rotating fan is collected by accelerometer 206. This time-domain signal associated with the given fan speed is subsequently converted into a frequency spectrum for the given fan speed using frequency-analysis tool 210, for example, by taking a fast Fourier transform (FFT) of the time-domain signal.

Hence, the fan speed sweep process generates a set of fan-vibration frequency spectra associated with the range of fan speeds, and each frequency spectrum includes a set of amplitudes corresponding to a set of frequency bins. The set of frequency bins can include all of the fan speeds (after being converted into frequencies) in the sweep range and also different harmonics of each of the fan speeds.

In some embodiments, each fan-vibration frequency spectrum is corrected to remove the effect of the resonance characteristics of chassis 204. For example, this correction can be achieved by performing a deconvolution operation in the frequency domain between the aforementioned vibration frequency response of chassis 204 and each of the fan-vibration frequency spectra. Note that this correction operation can be performed by frequency-analysis tool 210.

Next, the set of corrected vibration frequency spectra can be combined into a composite vibration spectrum for fan 202. In one embodiment, a composite vibration spectrum is obtained by selecting the maximum amplitude across the set of frequency spectra for each frequency bin, and using this maximum amplitude to represent the value at the frequency bin for the composite vibration spectrum. This operation results in a fan vibration profile which represents the worst-case vibration levels produced by fan 202 at each frequency bin. In some embodiments, frequency-analysis tool 210 generates this composite vibration spectrum as outputs, which is then stored in a storage device 214 inside computer system 201. For example, the composite vibration spectrum may be stored in computer system 201's firmware. The composite vibration spectrum can subsequently be used to easily identify all the resonant frequencies and their harmonics associated with the fan operation.

Process of Generating a Vibration Profile for a Cooling Fan

Figure 3:
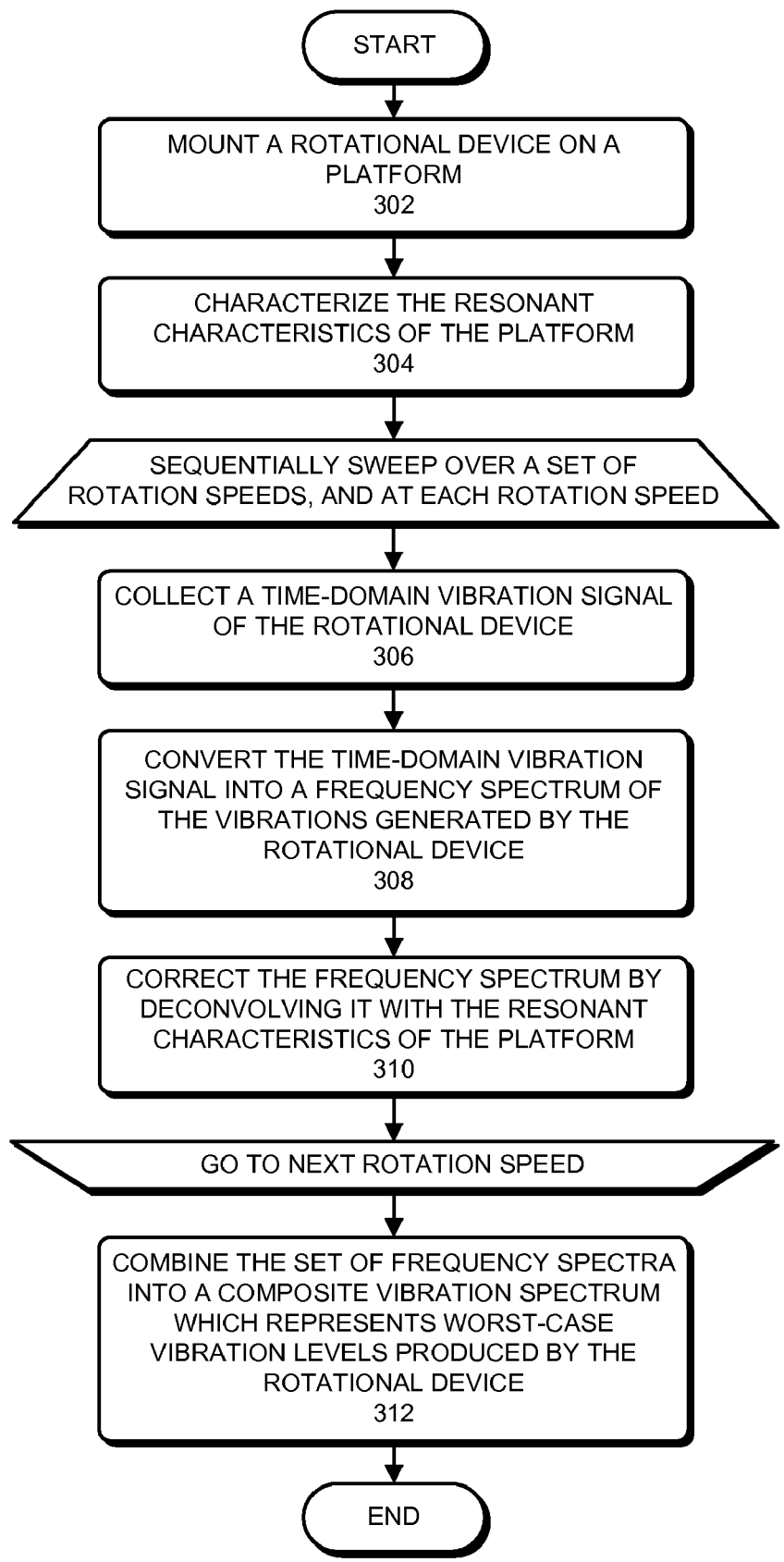
FIG. 3 presents a flowchart illustrating the process of generating a vibration profile for a rotational device in accordance with embodiments of the present invention.

FIG. 3 presents a flowchart illustrating the process of generating a vibration profile for a rotational device in accordance with embodiments of the present invention.

First, the rotational device is mounted on a platform (step 302). Note that this platform can include, but is not limited to the chassis of a computer system, a generic vibration test platform, or other types of platforms. The system then characterizes the resonant characteristics of the platform (step 304). Next, the system starts a sequential sweep of a rotation speed of the rotational device from an initial rotation speed to a final rotation speed over a set of rotation speeds. Specifically, during the speed sweep at each rotation speed, the system collects a time-domain vibration signal of the rotating device, for example, by using an accelerometer or other vibration sensors mechanically coupled to the platform or to the rotational device (step 306). Next, the system converts the time-domain vibration signal into the frequency-domain to obtain a frequency spectrum of the vibrations generated by the rotating device at that rotation speed (step 308). This step can involve performing an FFT on the time-domain signal.

The frequency spectrum for the given rotation speed is subsequently corrected by deconvolving the frequency spectrum with the resonant characteristic of the platform (step 310). Consequently, the system generates a set of frequency spectra associated with the set of rotation speeds. Finally, the system combines the set of frequency spectra into a composite vibration spectrum which represents worst-case vibration levels produced by the rotation device (step 312). In some embodiments, this involves selecting the maximum amplitude across the set of frequency spectra for each frequency bin, and using this maximum amplitude to represent the value at the frequency bin for the composite vibration spectrum.

Figure 4:
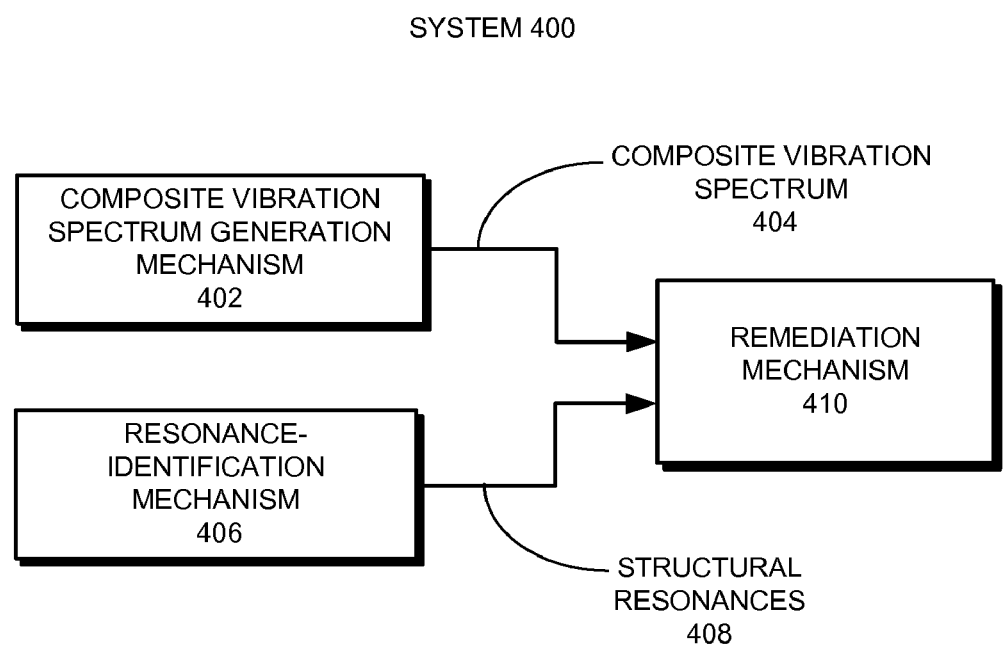
FIG. 4 illustrates a system for mitigating the effect of a structural resonance of a computer system in accordance with embodiments of the present invention.

FIG. 4 illustrates a system 400 for mitigating the effect of structural resonance of a computer system in accordance with an embodiment of the present invention. System 400 includes a composite vibration spectrum generation mechanism 402 which generates a composite vibration spectrum 404 that represents worst-case vibration levels produced by the rotation device. System 400 also includes a resonance-identification mechanism 406 which identifies one or more structural resonances 408 of the computer system. System 400 additionally includes a remediation mechanism 410 which receives composite vibration spectrum 404 from composite vibration spectrum generation mechanism 402 and structural resonances 408 from resonance-identification mechanism 406. Remediation mechanism 410 subsequently modifies composite vibration spectrum 404 to mitigate the effect of structural resonances 408 of the computer system.

Application

The above-described embedded-characterization-system can be used to perform rotation speed sweeps in a computer system to generate composite vibration spectra for cooling fans, or other rotational devices within the computer system. During computer system operation, the speed of a fan can be adjusted in accordance with the corresponding composite vibration spectrum of the fan. Note that such characterization and adjustment processes can be performed continuously through the product life of the computer system to account for fan aging, fan replacements, and other effects on the rotational vibration profiles.

The vibration profiles obtained for rotational cooling devices can be used in applications for improving the vibrational health of computer systems. In one application, these vibration profiles can be used for early stage evaluation of the effects of the vibrations produced by cooling fans or other rotational devices to be used in a computer system. Hence, during the mechanical design of the chassis, the chassis is not allowed to have the same resonances as those resonances in the vibration profiles, so that the chassis resonances do not excite the resonances of these rotational devices.

In another application, the obtained vibration profiles of the cooling fans can be used to compare cooling fans from various vendors and proactively identify which fans are likely to perform well in various server platforms and which fans are likely to cause vibration-related problems. For example, the vibration profiles of the cooling fans can be matched with the sensitivity profiles of HDDs, and only those fans which do not produce resonant vibrations in the sensitive ranges of the HDDs are selected. Hence, the composite vibration profile can be required from the cooling fan vendors as a specification in addition to other requirements in selecting fans for a specific server or storage product. Furthermore, the present technique facilitates establishing standards for a fan vendor on the amount and content of vibration produced by fans.

Moreover, the present technique facilitates creating a database of vibration characteristics for different fan models, including variations of the same model. This database can then be used to restrict allowable resonance characteristics for components in a system.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for a generating a vibration profile for a single rotational device in a computer system, the method comprising:
using at least one computer system for:
sequentially sweeping a rotation speed of the single rotational device over a range of rotation speeds, and, while driving the single rotational device at each rotation speed,
collecting a time-domain vibration signal produced by the single rotational device; and
computing a frequency spectrum of the time-domain vibration signal at each rotation speed, thereby generating a set of frequency spectra associated with two or more rotation speeds over the range of rotation speeds for the single rotational device;
combining the set of frequency spectra to generate a composite vibration profile for the single rotational device;
identifying at least one structural resonance of the computer system; and
modifying the composite vibration profile for the single rotational device to mitigate the effect of the at least one structural resonance of the computer system.

2. The method of claim 1, wherein collecting the time-domain vibration signal involves using a vibration sensor coupled to the single rotational device.

3. The method of claim 2, wherein the vibration sensor is an accelerometer.

4. The method of claim 1, wherein the single rotational device is a rotational cooling device, which can include a cooling fan, or an air mover.

5. The method of claim 1,
wherein each frequency spectrum comprises a set of values corresponding to a set of frequency bins; and
wherein combining the set of frequency spectra to generate the composite vibration profile involves, at each frequency bin, selecting the maximum amplitude among the set of amplitudes for the set of frequency spectra to represent the amplitude at the frequency bin for the composite vibration profile.

6. The method of claim 5, wherein the composite vibration profile represents worst-case vibration levels for the set of frequency bins.

7. The method of claim 1, wherein the method further comprises identifying a set of resonant frequencies within the composite vibration profile.

8. The method of claim 1, wherein the single rotational device is mechanically affixed to the chassis of the computer system.

9. A non-transitory computer readable storage medium storing instructions that when executed by a computer cause the computer to perform a method for generating a vibration profile for a single rotational device in a computer system, the method comprising:
sequentially sweeping a rotation speed of the single rotational device over a range of rotation speeds, and, while driving the single rotational device at each rotation speed,
collecting a time-domain vibration signal produced by the single rotational device; and
computing a frequency spectrum of the time-domain vibration signal at each rotation speed, thereby generating a set of frequency spectra associated with two or more rotation speeds over the range of rotation speeds for the single rotational device;

combining the set of frequency spectra to generate a composite vibration profile for the single rotational device;

identifying at least one structural resonance of the computer system; and modifying the composite vibration profile for the single rotational device to mitigate the effect of the at least one structural resonance of the computer system.

10. The non-transitory computer readable storage medium of claim 9, wherein collecting the time-domain vibration signal involves using a vibration sensor coupled to the single rotational device.

11. The non-transitory computer readable storage medium of claim 10, wherein the vibration sensor is an accelerometer.

12. The non-transitory computer readable storage medium of claim 9, wherein the single rotational device is a rotational cooling device, which can include a cooling fan, or an air mover.

13. The non-transitory computer readable storage medium of claim 9, wherein each frequency spectrum comprises a set of values corresponding to a set of frequency bins; and wherein combining the set of frequency spectra to generate the composite vibration profile involves, at each frequency bin, selecting the maximum amplitude among the set of amplitudes for the set of frequency spectra to represent the amplitude at the frequency bin for the composite vibration profile.

14. The non-transitory computer readable storage medium of claim 13, wherein the composite vibration profile represents worst-case vibration levels for the set of frequency bins.

15. The non-transitory computer readable storage medium of claim 9, wherein the method further comprises identifying a set of resonant frequencies within the composite vibration profile.

16. The non-transitory computer readable storage medium of claim 9, wherein the single rotational device is mechanically affixed to the chassis of the computer system.

17. An apparatus that generates a vibration profile for a single rotational device in a computer system, comprising:

a speed-sweep mechanism configured to sequentially sweep a rotation speed of the single rotational device over a range of rotation speeds;

a data-collection mechanism configured to collect a time-domain vibration signal produced by the single rotational device while the single rotational device is rotating at each rotation speed;

a computing mechanism configured to compute a frequency spectrum of the time-domain vibration signal associated with each rotation speed, thereby generating a set of frequency spectra associated with two or more rotation speeds over the range of rotation speeds for the single rotational device, wherein the computing mechanism is further configured to combine the set of frequency spectra to generate a composite vibration profile for the single rotational device;

a resonance-identification mechanism configured to identifying at least one structural resonance of the computer system; and a remediation mechanism configured to modify the composite vibration profile for the single rotational device to mitigate the effect of the at least one structural resonance of the computer system.

18. The apparatus of claim 17, wherein the data-collection mechanism includes a vibration sensor coupled to the single rotational device to collect the time-domain vibration signal.

19. The apparatus of claim 18, wherein the vibration sensor is an accelerometer.

20. The apparatus of claim 17, wherein the single rotational device is a rotational cooling device, which can include a cooling fan, or an air mover.

\* \* \* \* \*